United States Patent
Oberhänsli et al.

[11] 4,039,845
[45] Aug. 2, 1977

[54] OPTICAL-ELECTRICAL LIQUID PROBES

[75] Inventors: Jürg Oberhänsli, Kuttigen; Erwin Stalder, Erlinsbach; Willy Bulgheroni, Aarau; Josef Penasa, Triengen, all of Switzerland

[73] Assignee: Hectronic AG, Buchs, Switzerland

[21] Appl. No.: 707,245

[22] Filed: July 21, 1976

[30] Foreign Application Priority Data

July 25, 1975 Switzerland ............. 9491/75

[51] Int. Cl.² .................................. G01K 21/26
[52] U.S. Cl. ...................... 250/577; 250/227; 73/293; 350/96 R
[58] Field of Search .......... 250/227, 577; 73/293; 350/96 R

[56] References Cited
U.S. PATENT DOCUMENTS

| 3,164,663 | 1/1965 | Gale | 350/96 R |
|---|---|---|---|
| 3,509,353 | 4/1970 | Sundblad et al. | 350/96 R |
| 3,683,196 | 8/1972 | Obenhaus | 250/227 |

Primary Examiner—Rudolph V. Rolinec
Assistant Examiner—Michael J. Tokar
Attorney, Agent, or Firm—Saul Jecies

[57] ABSTRACT

An optical-electrical liquid probe for sensing the presence or absence of a liquid comprises a light emitter and a light receiver housed within a translucent hollow body. When there is no liquid adjacent a sensing part of the body, the light rays from the emitter pass to the receiver by refraction through the walls of the body. The presence of liquid adjacent the sensing part of the body causes the light rays to be refracted in such a manner that they no longer reach the receiver with the result that the state of the receiver changes.

23 Claims, 4 Drawing Figures

OPTICAL-ELECTRICAL LIQUID PROBES

BACKGROUND OF THE INVENTION

1. Field of the Invention

The present invention relates to a fluid sensing device and more particularly to an optical-electrical liquid probe which is intended to determine the presence or absence of a liquid in the immediate vicinity of the probe, by an optical method, and to signal it electrically to a position remote from the probe.

2. Description of the Prior Art

There has been proposed an optical-electrical liquid probe comprising a light emitter, a light receiver, constructed as a photoelectric transducer, and a body which is translucent to light rays and which has at least one surface which can be exposed to a liquid. The light emitter sends the light rays, which it produces, into the translucent body, so that they strike, from within the body, the surface which can be exposed to liquid, and are refracted in the absence of liquid at the said surface, in the direction of the light receiver. If, in the case of such a probe, the surface which can be subjected to liquid adjoins a liquid, the light rays issuing from this surface suffer no refraction, or at least a different refraction than if liquid is absent, the result of which is that virtually no light rays strike the light receiver and this results in a change in the electrical state of the light receiver. This previously proposed probe reacts in exactly the same manner whether the liquid present is translucent or opaque to light. Further, if an operating fault occurs, for example an interruption in the current supply, or the failure of the light emitter, the electrical output of the light receiver is in the same state as occurs in the presence of a liquid on the surface of the translucent body. Hence the use of this previously proposed probe offers particularly high safety in ensuring that containers are not over-filled.

An object of the present invention is to provide a liquid probe of the above type which remains operational even after exposure to a relatively highly viscous liquid and which is substantially insensitive to extraneous light and/or scattered light, that is to say to light which either does not originate from the light emitter fitted into the apparatus or which is scattered by particles contained in the liquid.

SUMMARY OF THE INVENTION

According to the invention, there is provided an optical-electrical liquid probe comprising a light emitter, a light receiver in the form of a photoelectric transducer, a body which is translucent to light rays and having at least one surface which can be exposed to a liquid, said light emitter being arranged to emit light rays, so that they strike, from within the body, the said surface which can be exposed to liquid, and are refracted, in the absence of liquid at the said surface, in the direction of the light receiver, wherein said translucent body is in the form of a hollow body defining an internal space, and said body comprises a widened hollow upper part, a narrowed hollow lower part having a circumferential wall, and a shoulder part located between the said parts, the narrowed lower part has a closed end remote from the shoulder part and is arranged to be externally exposed to liquid, the light emitter is located in the said internal space of the hollow body such that the light rays emitted by the light emitter pass outwards through the outer surface of the circumferential wall of the narrowed lower part at an acute angle and in such predetermined directions that, in the case of the absence of liquid from the vicinity of the narrowed lower part, the light rays pass through the shoulder part of the hollow body into the widened upper part, but in the presence of liquid the light rays do not reach the shoulder part, the light receiver is located in the interior of the widened upper part, and means are provided to prevent access, to the light receiver, of light rays which enter through the shoulder part from directions other than predetermined directions.

In a preferred embodiment of the invention, the translucent hollow body is rotationally symmetrical and the narrowed lower part can have an at least approximately cylindrical circumferential wall of at most 10 mm external diameter. The light emitter can, as desired, be located in the inner space of the narrowed lower part or in the inner space of the widened upper part in the region of the shoulder part of the hollow body. In the latter case the light emitter sends the light rays against a reflector located in the narrowed lower part, at its closed end, which reflector redirects the light rays against the circumferential wall of the narrowed lower part. The translucent hollow body can advantageously consist of a polymer which is hydrophobic, that is to say repels liquid, and/or is resistant to aggressive fluids.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENTS

Figure 1:
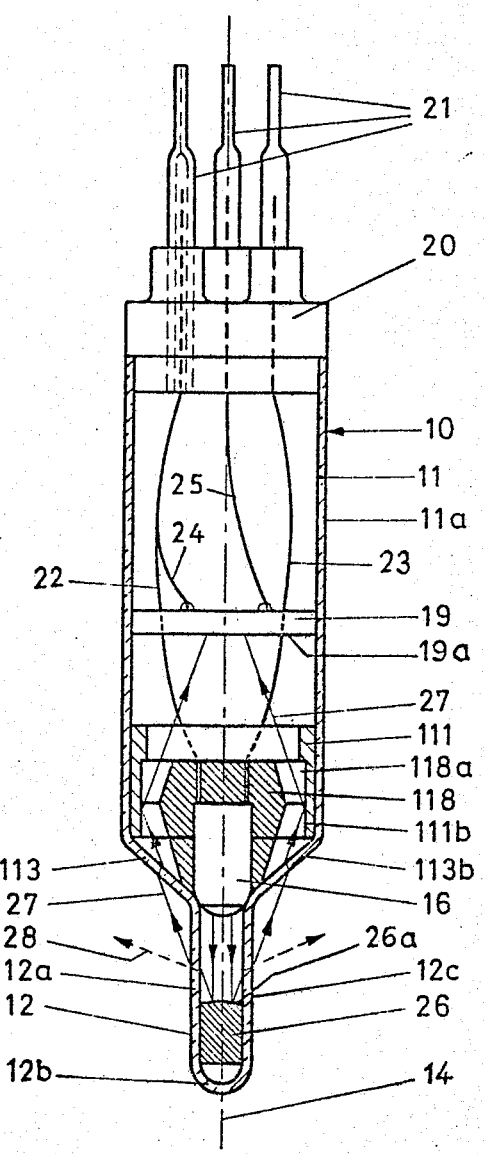
FIG. 1 shows a first embodiment of the liquid probe according to the invention, in axial longitudinal section.

Detailed reference is first made to FIG. 1. The liquid probe shown has a container-like hollow body 10 of a translucent material, preferably a polymeric plastics containing fluorine. The hollow body 10 has a widened hollow upper part 11, a narrowed hollow lower part 12 and a shoulder part 13 located between the said parts, the parts 11, 12, 13 being integral. The upper part 11 has a circumferential wall 11a substantially in the form of a hollow cylinder. The lower part 12 also has a circumferential wall 12a in the form of a hollow cylinder, of relatively low wall thickness and with an external diameter of at most 10 mm and preferably about 5 mm; it is furthermore closed, at its lower end, by a hemispherical or downwardly-pointed base 12b, which, together with the remainder of the hollow body 10, consists of a single piece of material. The upper part 11, the lower part 12 and the shoulder part 13 are of rotationally symmetrical structure relative to a common axis 14. The shoulder part 13 is conically flared upwards and has a relatively low wall thickness. The radial generating lines enclose, with the corresponding axial generating lines of the cylindrical outer surface 12c of the circumferential wall 12a of the narrowed lower part 12, an obtuse angle, that is to say an angle which significantly exceeds 90°.

Adjoining the shoulder part 13, an annular body 111 is inserted into the interior of the widened upper part 11, and rests against the circumferential wall 11a of the upper part 11 and has, on its inner face, a cylindrical reflecting surface 111b. A holder 118 for holding a light emitter 16 is centered in the annular body 111, through some radial arms 118a of the holder 118 being supported against the inner circumferential surface 111b of the annular body 111. The radial arms 118a create an annular gap, for the passage of light rays, between the annular body 111 and the holder 118, the said gap being interrupted solely by the arms. The light emitter 16 is, for example, an electrical filament lamp, the glass bulb of which forms a focussing lens 17, through which the light rays produced issue in at least approximately parallel beams. Instead of a filament lamp, a semi-conductor light source could equally well be provided. The light emitter 16 is in the inner space of the hollow body 11, more specifically in the region of the shoulder part 13. The position of the light emitter 16 is such that it emits the light rays in the direction of the axis of rotation 14, downwards into the inner space of the narrowed lower part 12. The holder 118 is constructed of opaque material and is of such shape that it screens the light emitter 16 against lateral and upward emission of light.

In the inner space of the upper part 11 of the hollow body 10, a disc-shaped light receiver 19 is provided, which consists of a photoelectric transducer, for example a photo-resistance or a photoelectric cell, of which the light-sensitive surface 19a faces downwards, that is to say faces the shoulder part 13. Preferably, the position of the light receiver 19 is adjustable by sliding the latter along the axis 14.

The upper part 11 is closed at its upper end by a cover 20 consisting of electrically insulating material and carrying at least three electrical connectors 21, for example plug pins. The light emitter 16 and the light receiver 19 are joined to the connectors 21 by electrical conductors 22, 23, 24 and 25.

In the inner space of the lower part 12, in the vicinity of its base 12b, is provided an insert 26, serving as a reflector, and having a reflecting surface 26a in the shape of the surface of a cone, the said surface being rotationally symmetrical relative to the axis 14 and facing the lens 17 of the light emitter 16. The reflecting surface 26a serves to redirect the light rays emitted by the light emitter 16 in such a way that they strike the circumferential wall 12a of the lower part 12 at an acute angle, pass through this circumferential wall 12a and then propagate in the direction of the cone-shaped outer surface 13b of the shoulder part 13, if the outer surface 12c of the circumferential wall 12a adjoins air, that is to say is not exposed to a liquid. The light rays then pass through the shoulder part 13 into the annular gap between the annular body 111 and the holder 118 and are then redirected, at the totally reflecting surface of reflection 11b, in the direction of the light receiver 19. When assembling the liquid probe, the light receiver 19 is set, by sliding it along the axis 14, so that the light flux which strikes it attains a maximum or that the electrical output of the light receiver has a predetermined magnitude if liquid is absent from the vicinity of the narrowed lower part 12. In this way, manufacturing tolerances, which influence the sensitivity of the probe, can substantially be balanced out.

The mode of use and action of the liquid probe described is as follows:

The liquid probe is mounted in the vertical position shown in FIG. 1, for example in a container for a liquid, so that the narrowed lower part 12 of the hollow body 10 is at the level corresponding to the maximum permissible liquid level. The light emitter 16 is connected, by means of the connectors 21, to a source of current (which is not shown), whilst the light receiver 19 is connected to an electrical signalling circuit or alarm circuit (which is also not shown). The light emitter 16 generates light rays which are emitted at least approximately parallel to the axis 14, onto the narrowed lower part 12, in the direction of the reflector 26. The light rays which strike the reflecting surface 26a of the reflector are reflected outwards at an angle, after which the light rays pass through the circumferential wall 12a of the lower part 12. If the lower part 12 is surrounded by air, the change of direction which occurs when the light rays enter the translucent material at the inner face of the circumferential wall 12a, due to optical refraction, is again reversed when the light rays issue from the outer surface 12c of the circumferential wall 12a. In doing so, the light rays issue from the narrowed lower part 12 in predetermined directions, so that they strike the outer surface 13b of the shoulder part 13 and there pass, virtually without change of direction, through the translucent material of the shoulder part 13 into the annular space between the annular body 111 and the holder 118. At the inner surface 1b of the annular body 111, the light rays are redirected, by total reflection, against the light-sensitive surface 19a of the light receiver 19. The path of the rays which has been described is shown in solid arrow lines 27 in FIG. 1.

If the liquid level in the liquid container in which the probe according to FIG. 1 is mounted should rise to the point that the narrowed lower part 12 is immersed in the liquid, the optical refraction process at the outer surface 12c of the circumferential wall 12a of the lower part 12 changes. Since liquids have a higher optical density than air and hence also have a correspondingly greater refractive index, the light beams which issue from the translucent material of the circumferential wall 12a are refracted substantially less, if a liquid is present, than in the case previously described. Accordingly, in a translucent liquid these light rays follow approximately the direction indicated by a broken arrow line 28 in FIG. 1 and pass by the shoulder part 3 without striking the latter. Accordingly, virtually no more light strikes the light receiver 19, and the electrical condition of the signalling circuit or alarm circuit connected to the light receiver is different from that in the previously described case, where the light generated by the light emitter 16 strikes the light receiver. This difference in the electrical states shows whether a liquid is present or absent at the outer surface 12c of the circumferential wall 12a of the narrowed lower part 12.

If the liquid is not a translucent liquid, but a substantially, or virtually completely, opaque liquid, there is, in addition to the higher optical density of this liquid as compared to air, also a light absorption which results in a progressive attenuation of the light rays which enter the liquid. However, the effect of such a liquid on the probe according to FIG. 1 is ultimately the same as the effect of a translucent liquid, namely that in both cases virtually no light any longer reaches the light receiver 19 if the narrowed lower part 12 is immersed in the liquid.

If the liquid, though more or less translucent, is permeated by suspended particles or gas bubbles, light scattering occurs at the particles or bubbles which the light rays strike. The resulting scattered light is diffuse, that is to say non-directional. Because of the optical arrangement described, only those rays of the scattered light, of which the direction coincides at least approximately with the transmission direction of the annular gap between the annular body 111 and the holder 118, can reach the light receiver 19, whilst the remaining scattered light rays, travelling in other directions, either do not strike the outer surface 13b of the shoulder part 13 at all or are kept from the light-sensitive surface 19a of the light receiver by the annular body 111 or the holder 118. Accordingly, the occurrence of scattered light only results in a relatively faint illumination of the light-sensitive surface 19a, for which reason, in this case also, the electrical state at the output of the light receiver 19 differs clearly from that which prevails if liquid is absent from the vicinity of the narrowed lower part 12. Accordingly, the probe is also able to detect and signal the presence of light-scattering liquids, for example milky liquids or liquids containing suspended matter. Just as the probe described is substantially insensitive to scattered light, it is also substantially insensitive to extraneous light which does not originate from the light emitter 16.

If the liquid level falls to below the closed end 12b of the narrowed lower part 12 of the probe according to FIG. 1, the residual liquid which initially still adheres to the outside of the lower part 12 drains down to the closed lower end 12b and finally drips off from there. The light rays emanating from the light emitter 16 then again strike the light receiver 19, as described above. The design of the outer shape, shown in the drawing, of the lower part 12 which can be exposed to the liquid assists the draining-down and dripping-off of the residual liquid. As is known, the adherence of liquids to convex surfaces is the lower, the smaller is the radius of curvature. Since the outer diameter of the lower part 12 is, as already mentioned, not more than 10 mm and preferably even only about 5 mm, even relatively viscous liquids are unable to adhere to the outer surface 12a of the circumferential wall 12 or to the base 12b. The adherence of liquids to the lower part 12 can be reduced yet further by suitable choice of the material of construction for the translucent hollow body 10. For use of the probe in liquid petroleum products and in numerous other liquids, such as chemicals, solvents and the like, certain polymeric plastics containing fluorine, such as, for example, polytetrafluoroethylene, have proved particularly suitable as a material for the hollow body 10, since they are both hydrophobic and chemically resistant.

A further advantage of the liquid probe described is that the optical path lengths which the light rays must travel within the translucent material of the hollow body 10 are relatively short and hence, in choosing the material of construction for the hollow body 10, it is not necessary to give special attention to high transparency. It is therefore possible to use a material which is particularly resistant to the effects of aggressive liquids, such as, for example, a polyethylene.

Figure 2:
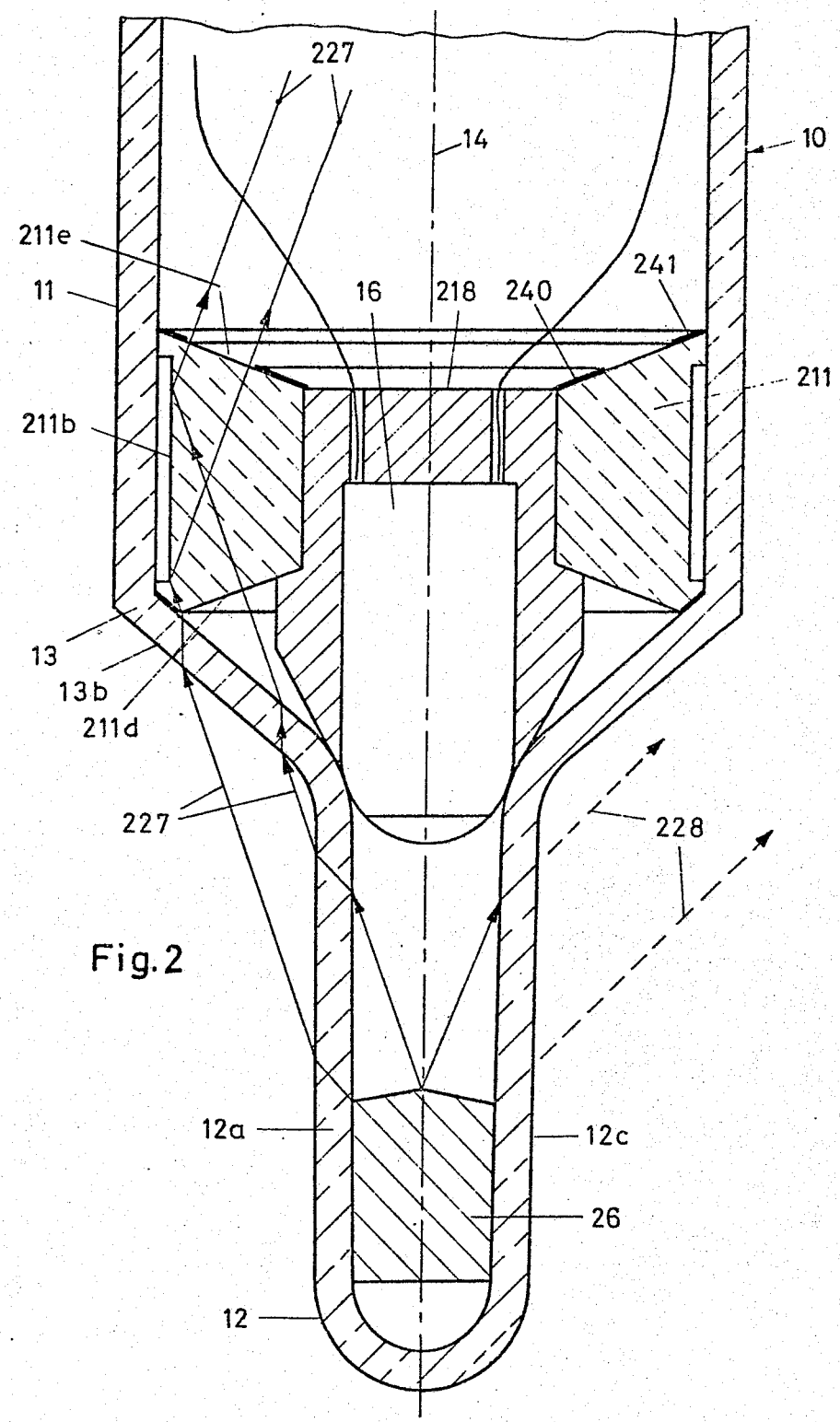
FIG. 2 shows, on a larger scale, a part of a second embodiment of the probe, in axial section.

The second embodiment of the liquid probe, shown partially in FIG. 2, differs from the embodiment according to FIG. 1 solely in that, in place of the annular body 111 having an inner reflecting surface 111b, an optical annular body 211 consisting of a translucent material is now provided, which body has a totally reflecting surface of reflection 211b at its outer periphery and is provided at the top and bottom with an end face 211d and 211e respectively, through which faces the light rays generated by the light emitter 16 pass at least approximately at right angles if liquid is absent from the vicinity of the narrowed lower part 12 of the hollow body 10. The left-hand half of FIG. 2 illustrates the path of the extreme rays of a beam, by the solid arrow lines 227. A holder 218 which holds the light emitter 16 is seated directly in the annular body 211. When the narrowed lower part 12 is immersed in a liquid, the light rays which issue through the cylindrical circumferential wall 12a of the lower part 12 assume a direction such that they no longer enter through the shoulder part 13 and also can no longer strike the light receiver 19, as is illustrated with broken arrow lines 228 in the right-hand half of FIG. 2.

The upper end face 211e of the optical annular body 211 is advantageously provided with an inner and an outer annular covering layer 240 and 241 respectively, which layers are opaque. By these means, the influence of scattered light and extraneous light on the light receiver 19 can be reduced without the light rays generated by the light emitter 16, which rays reach the light receiver 19 if liquid is absent from the vicinity of the narrowed lower part 12, being intersected.

Figure 3:
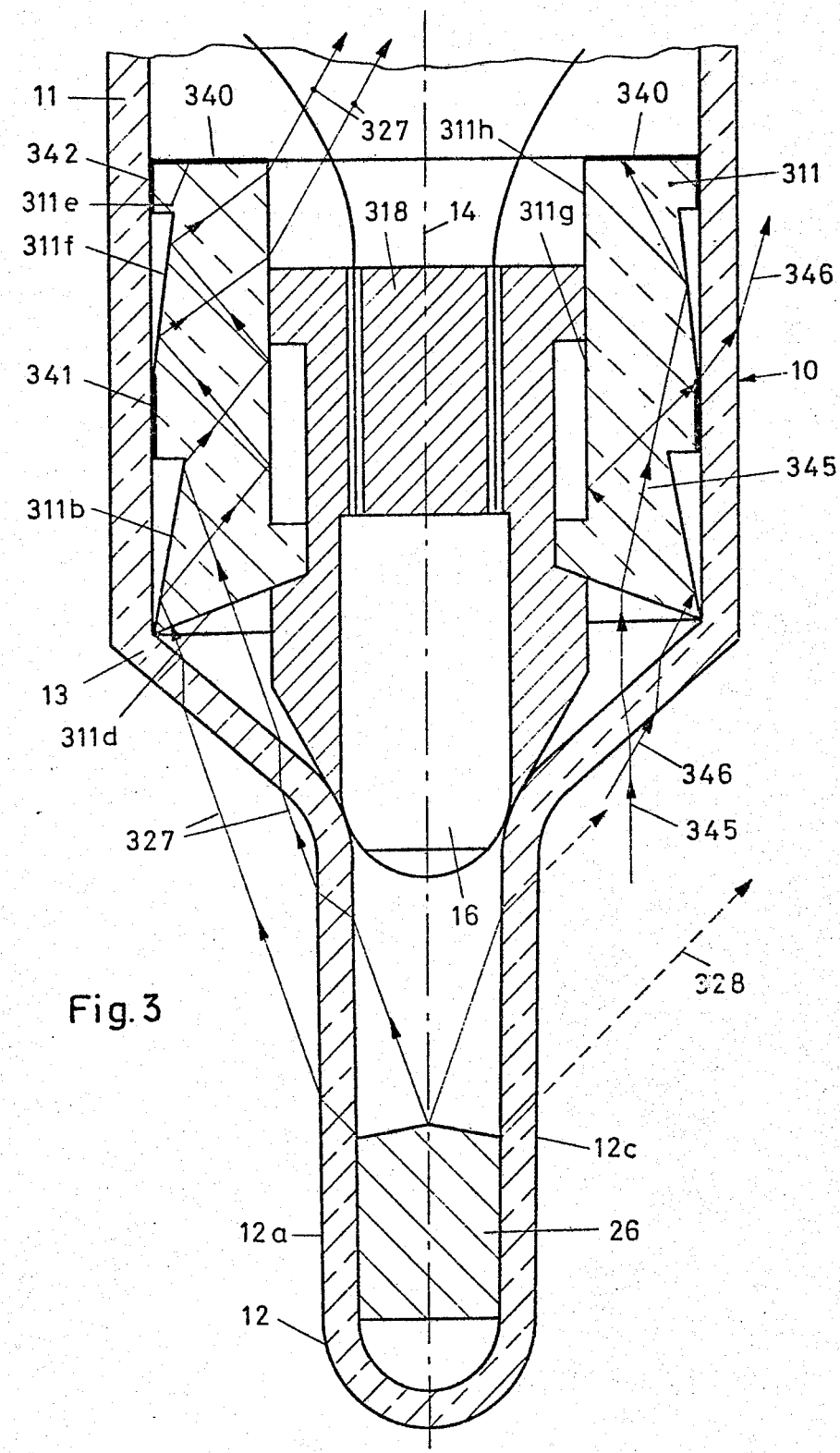
FIG. 3 is a representation, analogous to FIG. 2, of a further embodiment of the liquid probe according to the invention.

Even greater insensitivity to extraneous light or scattered light is achieved with the embodiment according to FIG. 3. This differs from the embodiment last described in that, in place of the optical annular body 211, an optical annular body 311 of increased size in the axial direction is provided, which body possesses, on its outer periphery, two cone-shaped totally reflecting surfaces of reflection 311b and 311f and, on its inner periphery, a cylindrical totally reflecting surface of reflection 311g. The lower end face 311d of the annular body 311 is so oriented, analogously to the surface 211d of the example according to FIG. 2, that the light rays originating from the light emitter 16 pass at least approximately at right angles through this end face 311d if liquid is absent from the vicinity of the narrowed lower part 12. The upper end face 311e is completely covered with an opaque layer 340. To allow the light rays to issue from the optical annular body 311, a cylindrical surface part 311h is provided on the inner periphery of the annular body 311, above the holder 318 which holds the light emitter 16. Finally, two opaque coverings 341 and 342 are also provided on the outer periphery of the annular body 311, between the two reflecting surfaces 311b and 311f, and above the upper reflecting surface 311f, respectively.

If liquid is absent from the vicinity of the narrowed lower part 12 of the translucent hollow body 10, the light rays generated by the light emitter 16 and reflected at the reflector 26 pass, after issuing from the cylindrical circumferential wall 12a of the lower part 12, through the shoulder part 13 and then through the end face 311d into the translucent material of the annular body 311. At the lower outer reflecting surface 311b, the light rays are reflected in such a way that they strike the reflecting surface 311g on the inner periphery of the annular body 311, where the light rays are reflected and thrown onto the upper outer reflecting surface 311f. After reflection at the surface 311f, the light rays issue from the annular body 311 through the cylindrical surface part 311h, and at the same time a refraction of the light rays in the direction of the light receiver takes place. The path of the rays which has been described is illustrated by solid arrow lines 327 in the left-hand half of FIG. 3.

If the narrowed lower part 12 is immersed in a liquid, the light rays issuing from the circumferential wall 12a of the lower part 12 are deflected, in accordance with the arrow lines 328, shown broken in the drawing, in a direction such that they can no longer reach the light receiver 9, so that the latter virtually remains dark. The special construction of the optical annular body 311, described above, and the opaque covering 340, 341 and 342 achieve a situation where access of extraneous light or scattered light to the light receiver 19 is made exceptionally difficult or is virtually completely eliminated. In the right-hand of FIG. 3, arrow lines 345 and 346 show two examples of the path of the rays of scattered light which enters through the shoulder part 313 and is produced, for example, by reflection and/or refraction of the light rays, issuing from the circumferential wall 12a of the narrowed lower part 12, at suspended particles or bubbles in the liquid, the presence of which the probe according to FIG. 3 is intended to detect. The embodiment according to FIG. 3 is therefore particularly suitable for monitoring the level of light-scattering or even luminescent liquids.

The two embodiments of the liquid probe shown in FIGS. 2 and 3 both have the advantage that the choice of the material of construction for the optical annular body, 211 and 311 respectively, can be made completely independently of the choice of the material for the translucent hollow body 10. Thus it becomes possible to choose, for the optical annular body 211 or 311, a material of construction having the most suitable optical properties, without having to pay attention to the resistance of this material to mechanical stresses or to the influence of aggressive media, since the annular bodies 211 and 311 are housed in a protected manner in the interior of the translucent hollow body 10. As already mentioned, it is possible to choose, for the manufacture of the hollow body 10, a material of which the optical properties are of secondary importance compared to the resistance to aggressive media, since the optical paths for the light rays within the relatively thin circumferential wall 12a of the narrowed lower part 12 and within the likewise relatively thin-walled shoulder part 213 or 313 are relatively short. In particular, reduced transparency of the material of the hollow body 10 has no significant adverse effect on the efficiency of operation of the liquid probe. The annular bodies 211 or 311 can also be constructed as an annular lens which concentrates the light rays, reflected at the reflector 26, onto the light receiver if liquid is absent.

Figure 4:
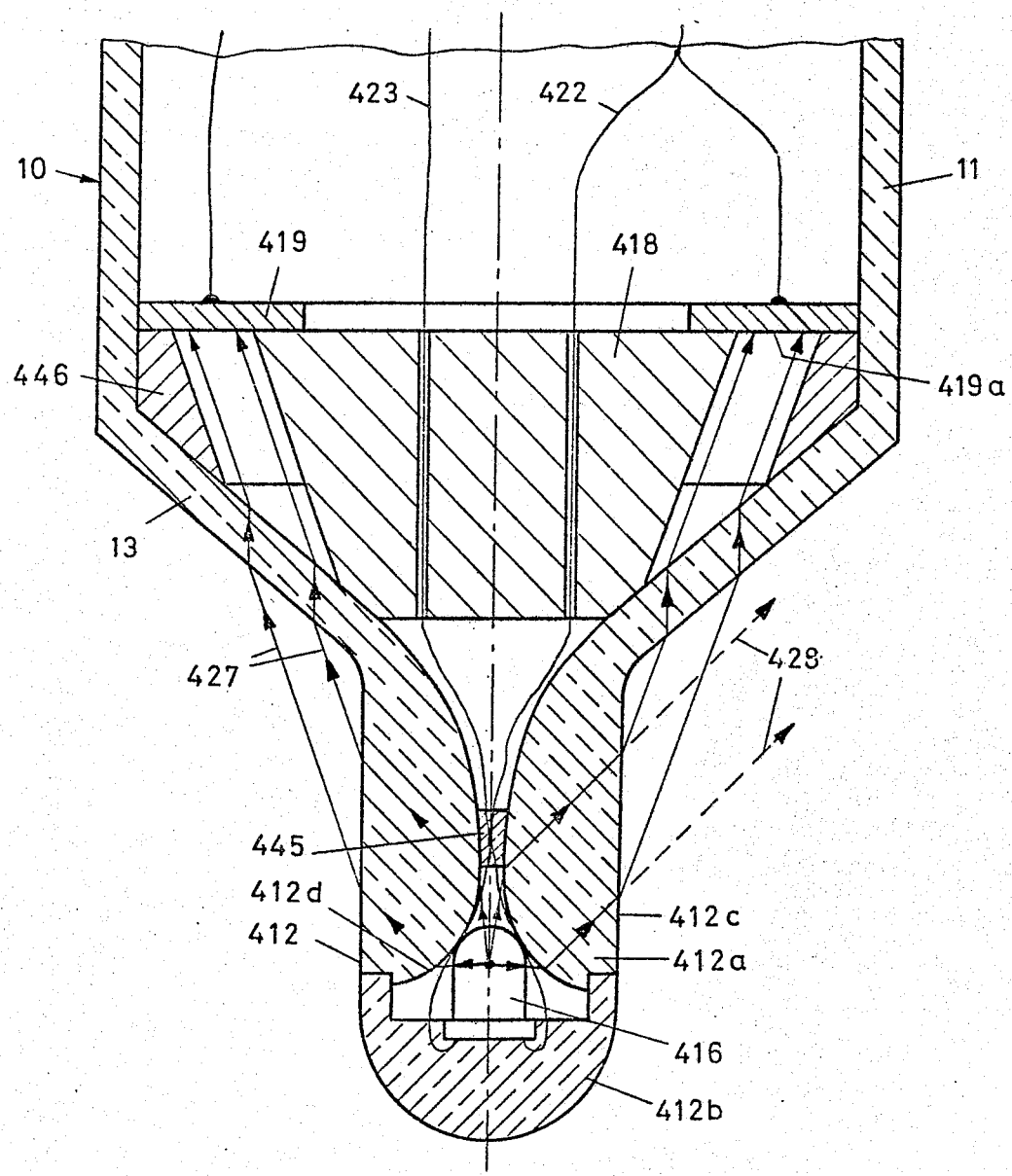
FIG. 4 illustrates a part of a fourth embodiment of the liquid probe according to the invention, in axial section.

In the case of the further embodiment, illustrated in FIG. 4, of the liquid probe according to the invention, the upper part 11 and the shoulder part 13 of the translucent hollow body 10 have the same construction as in the embodiments according to FIGS. 1 to 3. The circumferential wall 412a of the narrowed lower part 412 of the hollow body 10 has an external cylindrical surface 412c, as in the other examples. The inner surface 412d of the circumferential wall of the narrowed lower part, on the other hand, is convex, viewed in axial longitudinal section. The base 412b which closes the lower end of the narrowed lower part 412 is constructed as a separate piece. An upward-pointing light emitter 416 in the form of a semi-conductor light source, for example a GaAs diode, is located within the narrowed lower part 412, near its closed end, with the base 412b serving as a holder for the light emitter. After the introduction of the light emitter 416, the base 412b has been joined liquid-tight to the circumferential wall of the lower part 412, for example by means of an adhesive or by welding. An opaque plug 445 is present roughly in the center of the narrowed lower part 412.

In the widened upper part 11 of the translucent hollow body 10, an opaque ring 446 and, coaxially thereto, an insert 418 are inserted in the region of the shoulder part 13; the ring and the insert both consist of an opaque material and leave, between them, an annular gap for the passage of light rays. A light receiver 419, which is also annular, is located above the said annular gap. The connecting bars 422 and 423 for supplying the light emitter 416 pass through the plug 445 and through the insert 418.

When the liquid probe according to FIG. 4, described above, is in operation, the light rays emitted by the light emitter 416 are refracted at the convex inner surface 412d of the circumferential wall of the narrowed lower part 412 in such a way that they all impinge, at substantially identical acute angles, on the outer surface 412c of the circumferential wall. When the narrowed lower part 412 is in air, the light rays issuing from the outer surface 412c undergo refraction, in predetermined directions, towards the shoulder part 13 of the translucent hollow body 10. The light rays which penetrate the shoulder part 13 pass through the gap between the ring 446 and the insert 418 and fall on the light-sensitive surface 419a of the light receiver 419. The path of the rays which has been described is indicated in solid arrow lines 427 in FIG. 4. If, however, a liquid is present in the vicinity of the narrowed lower part 412, the light rays which issue from the outer surface 412c of the narrowed lower part follow a different path, as is shown by broken arrow lines 428 in FIG. 4, so that now the light rays no longer strike the shoulder part 13 and accordingly no longer reach the light receiver 419.

It can be seen that only those light rays can reach the light receiver 419, throgh th shoulder part 13 and the gap between the ring 446 and the insert 418, which impinge on the outer surface of the shoulder part 13 in predetermined directions, in accordance with the path 427 of the rays, whilst light rays which follow other directions are unable to gain access to the light receiver 419. This achieves a relatively high insensitivity of the probe to extraneous light and scattered light.

What is claimed is:

1. An optical-electrical liquid probe comprising a light emitter, a light receiver in the form of a photoelectric transducer, a body which is translucent to light rays and having at least one surface which can be exposed to a liquid, said light emitter being arranged to emit light rays, so that they strike, from within the body, the said surface which can be exposed to liquid, and are refracted, in the absence of liquid at the said surface, in the direction of the light receiver, wherein said translucent body is in the form of a hollow body defining an internal space, and said body comprises a widened hollow upper part, a narrowed hollow part having a circumferential wall, and a shoulder part located between the said parts, the narrowed lower part has a closed end remote from the shoulder part and is arranged to be externally exposed to liquid, the light emitter is located in the said internal space of the hollow body such that the light rays emitted by the light emitter pass outwards through the outer surface of the circumferential wall of the narrowed lower part at an acute angle and in such predetermined directions that, in the case of the absence of liquid from the vicinity of the narrowed lower part, the light rays pass through the shoulder part of the hollow body into the widened upper part, but in the presence of liquid the light rays do not reach the shoulder part, the light receiver is located in the interior of the widened upper part, and means are provided to prevent access, to the light receiver, of light rays which enter through the shoulder part from directions other than predetermined directions.

2. A liquid probe according to claim 1, in which the said hollow body is rotationally symmetrical about a longitudinal axis and the said outer surface of the circumferential wall of the narrowed lower part is approximately cylindrical with a diameter of 10 mm at most.

3. A liquid probe according to claim 2, further comprising reflector means located in the narrowed lower part adjacent said closed end, said reflector means being arranged to reflect, against the circumferential wall of the narrowed lower part, light rays emitted by the light emitter.

4. A liquid probe according to claim 3, wherein the light emitter is arranged to emit light rays at least approximately parallel to said longitudinal axis of the hollow body into the inner space of the narrowed lower part, and the reflector has a reflecting surface of conical form.

5. A liquid probe according to claim 1, wherein the light emitter is located in the inner space of the widened upper part adjacent the shoulder part.

6. A liquid probe according to claim 1, wherein the light emitter is located in the interior of the narrowed lower part of the hollow body adjacent said closed end.

7. A liquid probe according to claim 6, wherein the said circumferential wall of the narrowed lower part has a convex surface arranged to align the light rays emitted by the light emitter.

8. A liquid probe according to claim 1, wherein the said means for preventing access, to the light receiver, of light rays which enter through the shoulder part in other than the predetermined directions comprises at least one reflecting surface.

9. A liquid probe according to claim 1, wherein the said means for preventing access, to the light receiver, of light rays which enter through the shoulder part in other than the predetermined directions comprises at least one optical refracting surface.

10. A liquid probe according to claim 1, wherein the said means for preventing access, to the light receiver, of light rays which enter through the shoulder part in other than the predetermined directions comprises at least one reflecting surface and at least one optical refracting surface.

11. A liquid probe according to claim 8, wherein the widened upper part has a circumferential wall and the reflecting surface is of annular shape and extends along the circumferential wall of the widened upper part.

12. A liquid probe according to claim 11, wherein said reflecting surface is of cylindrical form.

13. A liquid probe according to claim 11, wherein said reflecting surface is of conical form.

14. A liquid probe according to claim 11, further comprising a ring inserted into the widened upper part, said ring having an inner circumferential surface which defines said reflecting surface.

15. A liquid probe according to claim 11, further comprising a translucent annular body having a totally reflecting outer circumferential surface, and at least one optical refracting surface, said annular body being inserted into the inner space of the widened upper part and the said outer circumferential surface of the annular body defining said reflecting surface.

16. A liquid probe according to claim 15, wherein the translucent annular body further comprises at least one totally reflecting internal circumferential surface, the translucent annular body being so arranged that the light rays which enter through the shoulder part, in the predetermined directions, arrive at the light receiver after repeated reflection at the outer circumferential surface and at the inner circumferential surface of the translucent annular body.

17. A liquid probe according to claim 1, further comprising an opaque insert provided in the inner space of the widened upper part of the hollow body in the region of the shoulder part, said insert being arranged to restrict the path of the light rays which enter through the shoulder part in the predetermined directions.

18. A liquid probe according to claim 17, wherein the opaque insert acts as a holder for the light emitter.

19. A liquid probe according to claim 1, wherein the outer surface of the shoulder part of the hollow body is of conical form which subtends an obtuse angle with the outer surface of the circumferential wall of the narrowed lower part.

20. A liquid probe according to claim 5, wherein the light receiver is located to the side of the light emitter remote from the narrowed part and at a distance from the said emitter such that the light rays from the light emitter and which enter through the shoulder part in the predetermined directions, are directed around the light emitter to reach the light receiver.

21. A liquid probe according to claim 16, wherein the distance of the light receiver from the shoulder part of the hollow body is adjustable.

22. A liquid probe according to claim 1, wherein the hollow body is composed of a polymer which repels liquid and which is resistant to aggressive liquids.

23. A liquid probe according to claim 1, wherein the hollow body is composed of a polymer which is resistant to aggressive liquids.

* * * * *